US009229435B2

(12) United States Patent
Matsuzaki

(10) Patent No.: US 9,229,435 B2
(45) Date of Patent: Jan. 5, 2016

(54) ELECTRONIC TIMEPIECE AND SATELLITE SIGNAL RECEIVING METHOD

(71) Applicant: Seiko Epson Corporation, Tokyo (JP)

(72) Inventor: Jun Matsuzaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/709,976

(22) Filed: May 12, 2015

(65) Prior Publication Data
US 2015/0338830 A1    Nov. 26, 2015

(30) Foreign Application Priority Data
May 20, 2014  (JP) .................................. 2014-104197

(51) Int. Cl.
*G04R 20/04*    (2013.01)
(52) U.S. Cl.
CPC ..................................... *G04R 20/04* (2013.01)
(58) Field of Classification Search
CPC ......... G04R 20/00; G04R 20/02; G04R 20/04
USPC ......................................................... 368/47
See application file for complete search history.

(56) References Cited

U.S. PATENT DOCUMENTS

| 8,014,233 | B2 * | 9/2011 | Matsuzaki | G01S 19/14 342/357.63 |
| 8,233,354 | B2 | 7/2012 | Fujisawa | |
| 2009/0274011 | A1 * | 11/2009 | Fujisawa | G04G 5/002 368/47 |
| 2012/0188123 | A1 | 7/2012 | Baba | |
| 2012/0269042 | A1 * | 10/2012 | Honda | G04R 20/02 368/47 |

FOREIGN PATENT DOCUMENTS

JP    2009-294198 A    12/2009
JP    2012-150047 A    8/2012

* cited by examiner

*Primary Examiner* — Vit W Miska

(57) ABSTRACT

A GPS wristwatch has a reception mode setting unit that sets a reception mode of a reception unit; and a locking level setting unit that sets a locking performance. The reception mode setting unit sets the reception mode to an automated timekeeping mode when an automated reception condition is met; sets the reception mode to a manual timekeeping mode when a first operation of an input unit is detected; and sets the reception mode to a positioning mode when a second operation of the input unit is detected. The locking level setting unit sets the locking performance to a high level when the reception mode is set to the manual timekeeping mode or the positioning mode, and sets the locking performance to a low level that is lower than the high level when the reception mode is set to the automated timekeeping mode.

6 Claims, 14 Drawing Sheets

ELECTRONIC TIMEPIECE AND SATELLITE SIGNAL RECEIVING METHOD

BACKGROUND

1. Technical Field

The present invention relates to an electronic timepiece that receives satellite signals, and to a satellite signal receiving method.

2. Related Art

GPS satellites that orbit the Earth on known orbits are used in the Global Positioning System (GPS), a system enabling a GPS receiver to determine its own location. GPS devices that receive satellite signals transmitted from the GPS satellites, acquire time information and positioning information carried in the satellite signals, and execute processes to adjust the time kept by the GPS receiver or determine the current location of the GPS receiver are common today.

The processes of receiving satellite signals transmitted from the GPS satellites include automated reception processes that are executed to receive satellite signals when automatic reception conditions are met, and unconditional reception processes (manual reception processes) that execute the satellite signal reception process in response to a user operation (intention). See, for example, JP-A-2012-150047.

Because the automated reception process is executed regardless of the user's intention when the reception conditions are met, the user of the GPS device may be indoors or in another location where satellite signals are hard to receive when the reception process starts. When this happens, reception may continue to fail while the user remains in that location, and power consumption increases when the reception process continues for a long time.

SUMMARY

An electronic timepiece and a satellite signal reception process according to the present invention enable reducing power consumption.

An electronic timepiece according to one aspect of the invention has a reception unit that locks and receives satellite signals, and can set the locking performance for locking satellite signals on multiple levels; an input unit; a reception mode setting unit that sets the reception mode of the reception unit; and a locking level setting unit that sets the locking performance. The reception mode setting unit sets the reception mode to an automated timekeeping mode that acquires time information based on the locked and received satellite signal when an automated reception condition is met; sets the reception mode to a manual timekeeping mode that acquires time information based on the locked and received satellite signal when a first operation of the input unit is detected; and sets the reception mode to a positioning mode that acquires positioning information and time information based on the locked and received satellite signals when a second operation of the input unit is detected. The locking level setting unit sets the locking performance to a high level when the reception mode is set to the manual timekeeping mode or the positioning mode, and sets the locking performance to a low level that is lower than the high level when the reception mode is set to the automated timekeeping mode.

When the satellite signal locking performance decreases, the satellite signal search time increases and it becomes more difficult to successfully receive satellite signals, but the peak current consumption decreases. If the locking performance increases, the satellite signal search time decreases and successfully receiving satellite signals becomes easier, but the peak current consumption increases.

When the reception mode is set to the automated timekeeping mode in the invention, the locking performance is set to a low level. As a result, the average power consumption of the reception process can be reduced in the reception process of the automated timekeeping mode (automated reception process) compared with when the locking performance is set to a high level.

More specifically, because the automated reception process executes irrespective of the user's intention if the automated reception condition is met, the user of the electronic timepiece may be indoors or in another location where satellite signals are hard to receive when the reception process starts. As a result, locking and receiving a satellite signal often fails, and the reception process often continues until the set timeout time, even though the locking performance is set to the high level.

If the locking performance is set to the low level in the automated reception process because of the relatively high possibility that satellite signal locking and receiving will fail, the peak current consumption can be reduced and average power consumption by the reception process can be reduced compared with when the locking performance is set to the high level.

The invention also sets the locking performance to the high level when the reception mode is set to the manual timekeeping mode or the positioning mode. As a result, average power consumption by the reception process can be reduced compared with when the locking performance is set to the low level in the reception processes of the manual timekeeping mode and positioning mode (manual reception process).

More specifically, because the manual reception process is executed in response to a user action, the person using (wearing) the electronic timepiece is typically in another environment, such as outdoors, where satellite signals can be easily received. As a result, by setting the locking performance to a high level, satellite signals can often be quickly locked and received, and the reception process can end in a short time.

As a result, the average power consumption of the reception process can be reduced in the manual reception mode even if the peak current consumption is high because the reception time is shortened by increasing the locking performance.

By thus setting the satellite signal locking performance according to the reception mode in an electronic timepiece that can selectively set the automated timekeeping mode, manual timekeeping mode, and positioning mode, the invention can reduce the average power consumption of the reception process in each reception mode.

Further preferably in an electronic timepiece according to another aspect of the invention, the reception unit has a correlation unit that determines the correlation between the satellite signal and a local code that is used to lock a satellite signal; the correlation unit searches for a satellite signal frequency by sequentially changing the frequency of the local code in a set frequency band; the number of searches per unit time of the frequency by the correlation unit can be set in multiple levels; and the locking level setting unit sets the number of searches to a high search count when the locking performance is set to the high level, and sets the number of searches to a low search count that is lower than the high search count when the locking performance is set to the low level.

The correlation unit that acquires the correlation for acquiring satellite signals searches satellite signal frequencies by sequentially changing the frequency of the local code within a set frequency band to handle satellite signal frequency variations due to the Doppler effect.

In this aspect of the invention, the number of searches per unit time of the frequency in the correlation process is set in multiple levels.

When the reception mode is set to the automated timekeeping mode, the number of searches is set to a low search count. As a result, the peak current consumption can be reduced compared with when the number of searches is set to a high search count. More specifically, if the number of searches per unit time is low, that is, if the search speed is low, the processing load of the correlation unit decreases and peak current consumption also decreases. Therefore, because the peak current consumption can be reduced in the automated reception process, the average power consumption by the reception process can be reduced as described above.

When the reception mode is set to the manual timekeeping mode or positioning mode, the search count is set to a high search count. As a result, the search time can be shortened compared with when the search count is set to a low search count. More specifically, if the number of searches per unit time is high, that is, if the search speed is high, the processing load of the correlation unit increases and peak current consumption also increases. However, because more frequencies can be searched per unit time, the search time until the frequency of the satellite signal is found can be shortened, and power consumption can be reduced. Therefore, average power consumption by the reception process can be reduced as described above because the satellite signal locking performance can be increased in the manual reception process.

The configuration of the correlation unit also does not need to be changed greatly because the invention can simply change the number of searches executed by a commonly used correlation unit. Design-related costs can therefore be reduced.

Further preferably in an electronic timepiece according to another aspect of the invention, the reception unit has an amplifier that amplifies the satellite signal; the gain of the amplifier can be set to plural levels; and the locking level setting unit sets the gain to a high gain when the locking performance is set to the high level, and sets the gain to a low gain that is lower than the high gain when the locking performance is set to the low level.

In this aspect of the invention, the gain of the amplifier can be changed between multiple levels.

When the reception mode is set to the automated timekeeping mode, the gain is set to a low gain setting. As a result, peak current consumption can be reduced compared with when the gain is set to a high gain setting. More specifically, because the peak current consumption can be reduced in the automated reception process, the average power consumption by the reception process can be reduced as described above.

When the reception mode is set to the manual timekeeping mode or positioning mode, the gain is set to a high gain. Because satellite signals with low signal strength can be more easily locked than when the gain is set to a low gain, the search time can be effectively shortened. More specifically, because the satellite signal locking performance can be increased in the manual reception process, the average power consumption by the reception process can be reduced as described above.

This aspect of the invention can also improve the probability of locking onto a satellite signal in the manual reception process compared with when the gain is set to a low gain, for example, even when only satellite signals with low signal strength can be observed. As a result, the probability of successful reception can be increased particularly in the positioning mode that requires locking onto satellite signals from four satellites.

Further preferably in an electronic timepiece according to another aspect of the invention, the reception unit has a correlation unit that determines the correlation between the satellite signal and a local code that is used to lock a satellite signal; the correlation unit has a plurality of correlators, and can set the number of correlators that operate in plural levels; and the locking level setting unit sets the number of correlators that operate to a high correlator count when the locking performance is set to the high level, and sets the number of correlators that operate to a low correlator count that is lower than the high correlator count when the locking performance is set to the low level.

In this aspect of the invention, the number of operating correlators can be set in multiple levels.

When the reception mode is set to the automated timekeeping mode, the number of correlators is set to a low number. As a result, peak current consumption can be reduced compared with when the number of correlators is set to a high number. More specifically, because the peak current consumption can be reduced in the automated reception process, the average power consumption by the reception process can be reduced as described above.

When the reception mode is set to the manual timekeeping mode or positioning mode, the number of correlators is set to a high number. Because the correlation between the local code and the satellite signals can be more easily acquired than when the number of correlators is set to a low number, the search time can be shortened. More specifically, because the satellite signal locking performance can be increased in the manual reception process, the average power consumption by the reception process can be reduced as described above.

Furthermore, because only the number of operating correlators is changed, the processing load of the reception unit can be reduced more than when the number of searches per unit time of the frequency is changed in the correlator.

Further preferably an electronic timepiece according to another aspect of the invention also has a solar cell; and power output detection circuit that detects the output power of the solar cell. The automated timekeeping mode includes a light-based timekeeping mode that acquires time information based on the locked and received satellite signal when the power output detected by the power output detection circuit equals or exceeds an environment detection threshold, and a scheduled timekeeping mode that acquires time information based on the locked and received satellite signal when a preset time is reached. The locking level setting unit sets the locking performance to a first level when the reception mode is set to the manual timekeeping mode or the positioning mode, sets the locking performance to second level that is lower than the first level when the reception mode is set to the light-based timekeeping mode, and sets the locking performance to third level that is lower than the second level when the reception mode is set to the scheduled timekeeping mode.

When the reception mode is set to the light-based timekeeping mode in this aspect of the invention, the satellite signal locking performance is set to a second level, and when the reception mode is set to the scheduled timekeeping mode, the locking performance is set to a third level that is lower than the second level. As a result, the average power consumption by the reception process of the automated timekeeping mode can be reduced.

More specifically, the environment detection threshold of the light-based timekeeping mode is set to a value differentiating between the amount of light when the solar cell is exposed to direct sunlight when outdoors or beside a window indoors, and the amount of light when the solar cell is indoors and exposed only to indoor lighting, thereby enabling detecting if the electronic timepiece is in an environment where satellite signals can be received. By using the amount of light detected by the power output detection circuit being greater than or equal to the environment detection threshold as the automated reception condition in the light-based timekeeping mode, the reception process can be executed in an environment where the electronic timepiece can easily receive satellite signals.

Because the reception process starts in the scheduled timekeeping mode when the scheduled time is reached irrespective of whether or not the electronic timepiece is located where satellite signals can be easily received, satellite signal reception is more difficult than in the light-based timekeeping mode and the reception process often continues until operation times out.

As a result, by increasing the locking performance in the light-based timekeeping mode compared with the scheduled timekeeping mode, locking and receiving satellite signals succeeds more quickly and the reception process ends in less time, and power consumption by the reception process can often be reduced.

Power consumption by the reception process can also often be reduced more in the scheduled timekeeping mode than in the light-based timekeeping mode by reducing the locking performance and lowering the peak current consumption.

Therefore, the average power consumption by the reception process in the automated timekeeping mode can be further reduced by setting the locking performance in the light-based timekeeping mode higher than the locking performance in the scheduled timekeeping mode, or in other words by setting the locking performance in the scheduled timekeeping mode lower than the locking performance in the light-based timekeeping mode.

Another aspect of the invention is a satellite signal receiving method of an electronic timepiece having a reception unit that locks and receives satellite signals, and an input unit, the satellite signal receiving method including: setting the reception mode of the reception unit to an automated timekeeping mode that acquires time information based on the locked and received satellite signal when an automated reception condition is met; setting the reception mode to a manual timekeeping mode that acquires time information based on the locked and received satellite signal when a first operation of the input unit is detected; setting the reception mode to a positioning mode that acquires positioning information and time information based on the locked and received satellite signals when a second operation of the input unit is detected; and setting the locking performance to a high level when the reception mode is set to the manual timekeeping mode or the positioning mode; and setting the locking performance to a low level that is lower than the high level when the reception mode is set to the automated timekeeping mode.

This aspect of the invention reduces power consumption in the same way as the electronic timepiece of the invention described above.

Other objects and attainments together with a fuller understanding of the invention will become apparent and appreciated by referring to the following description and claims taken in conjunction with the accompanying drawings.

DESCRIPTION OF EMBODIMENTS

Embodiment 1

A preferred embodiment of the present invention is described below with reference to the accompanying figures.

Figure 1:
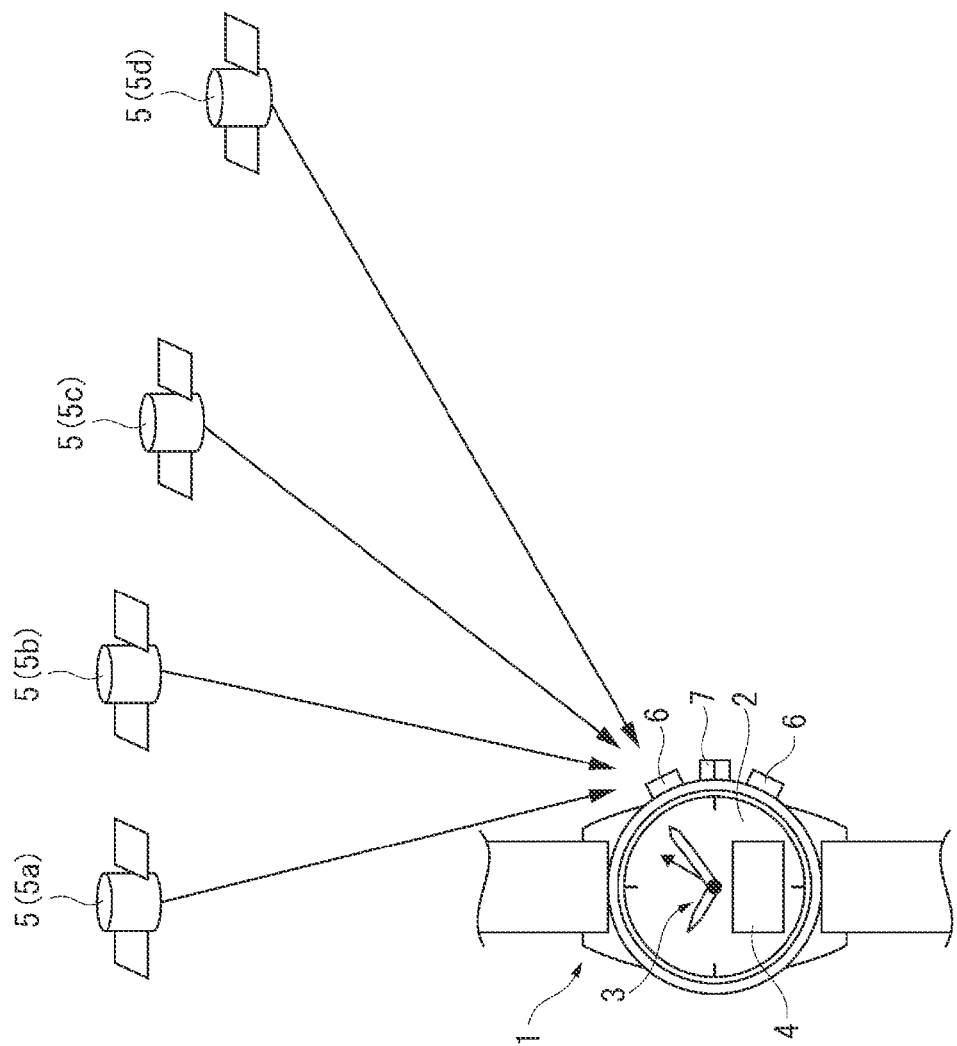
FIG. 1 illustrates a wristwatch with an embedded GPS satellite signal receiver according to the invention.

FIG. 1 illustrates a wristwatch with an embedded GPS satellite signal receiver 1 (referred to below as GPS wristwatch 1) according to this embodiment of the invention.

As shown in FIG. 1, the GPS wristwatch 1 has a display means including a dial 2 and hands 3. An opening is formed in part of the dial 2, and a display 4 such as an LCD panel is visible through the opening. The GPS wristwatch 1 is therefore a so-called combination watch having both hands 3 and a display 4.

The hands 3 include a second hand, minute hand, and hour hand, and are driven by a stepper motor through a wheel train.

The display 4 includes an LCD panel, for example, and can display information such as the current time and user prompts in addition to time zone data as described below.

The GPS wristwatch 1 is configured to receive satellite signals from plural GPS satellites 5 orbiting the Earth on specific known orbits, acquire satellite time information from the satellite signals, and adjust the internal time kept by the GPS wristwatch 1 and display navigation information, specifically the current location, on the display 4.

The GPS wristwatch 1 also has buttons 6 and a crown 7, which render the input unit of the invention.

Each GPS satellite 5 (5a, 5b, 5c, 5d) orbits the Earth on a specific orbit, and transmits a navigation message superimposed on a 1.57542 GHz microwave signal (L1 band). A GPS satellite 5 is an example of a positioning information satellite, and a 1.57542 GHz microwave signal with a superimposed navigation message (referred to below as a satellite signal) is an example of a satellite signal in the invention.

There are currently 32 GPS satellites 5 in the constellation and each GPS satellite 5 superimposes a unique 1023-chip (1 ms) pattern called a C/A code (Coarse/Acquisition Code) on the transmitted satellite signal. The C/A code is a pseudorandom noise (PRN) code unique to a specific GPS satellite 5. Each chip has a value of +1 or −1, and the C/A code appears to be a random pattern. The C/A code superimposed on the satellite signal can therefore be detected by correlating the satellite signal that is actually received with the known pattern of each C/A code.

The format of the satellite signals (navigation message) transmitted from the GPS satellites 5 is described next.

Figure 2A:
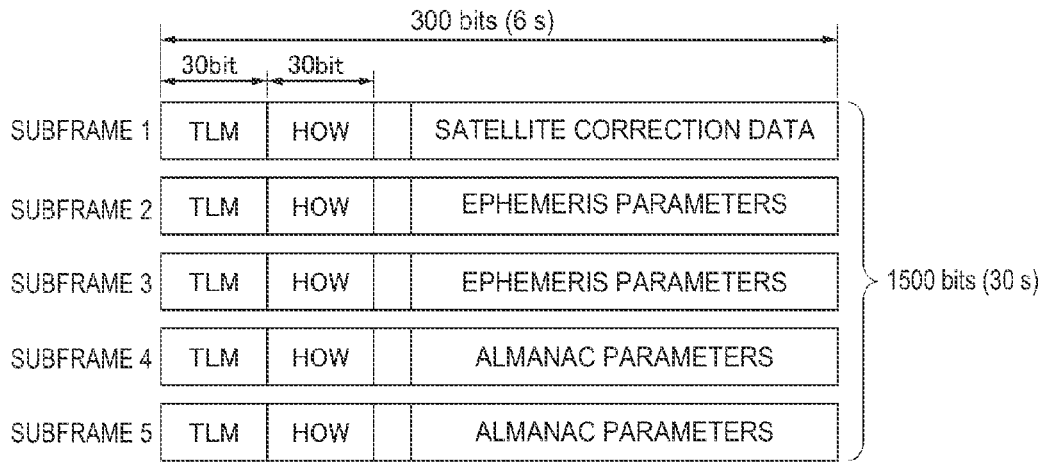
FIGS. 2A, 2B and 2C illustrate the format of satellite signals (navigation message) transmitted from GPS satellites.
Figure 2B:
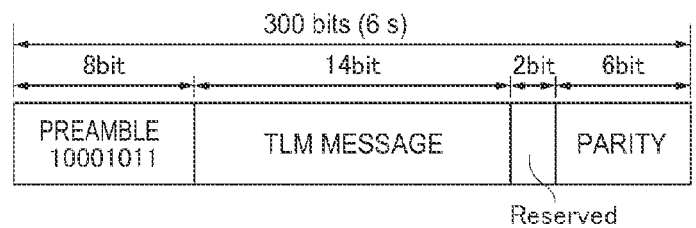
Figure 2C:
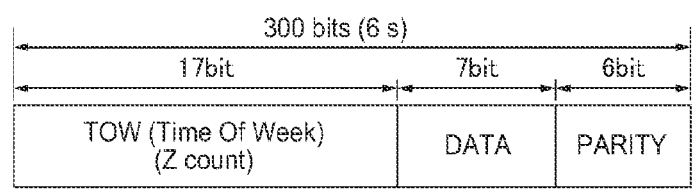

FIG. 2A to FIG. 2C illustrate the format of satellite signal (navigation message) transmitted from each GPS satellite 5.

As shown in FIG. 2A, a navigation message is composed of main frame units each containing 1500 bits. Each main frame is divided into five subframes 1 to 5 of 300 bits each. The data in one subframe is transmitted in 6 seconds from a GPS satellite 5. It therefore takes 30 seconds for a GPS satellite 5 to transmit the data in one main frame.

Subframe 1 contains satellite correction data including the week number (WN). The week number (year-month-day information) identifies the week to which the current GPS time information belongs. More specifically, GPS time started at 00:00:00 on Jan. 6, 1980 in UTC (Coordinated Universal Time), and the week number of the week that started that day is week number 0. The week number is updated every week.

Subframes 2 and 3 carry ephemeris parameters, that is, detailed information about the orbit of a specific GPS satellite 5. Subframes 4 and 5 carry almanac parameters, coarse orbit information for all GPS satellites 5.

Each of subframes 1 to 5 starts with a telemetry (TLM) word storing 30 bits of telemetry data followed by a HOW word (handover word) storing 30 bits of handover data.

Therefore, while the TLM and HOW words are transmitted at 6-second intervals from the GPS satellites 5, the week number data and other satellite correction data, ephemeris, and almanac data are transmitted at 30-second intervals.

As shown in FIG. 2B, the TLM word contains a preamble, a TLM message and reserved bits, and parity data.

As shown in FIG. 2C, the HOW word contains GPS time information called the TOW or Time of Week (also called the Z count). The time information of the invention refers to the Z count contained in the GPS time information. The Z count denotes in seconds the time passed since 00:00 of Sunday each week, and is reset to 0 at 00:00 Sunday the next week. More specifically, the Z count denotes the time passed from the beginning of each week in seconds. The Z count denotes the GPS time at which the first bit of the next subframe data is transmitted. For example, the Z count transmitted in subframe 1 denotes the GPS time that the first bit in subframe 2 is transmitted. The HOW word also contains 3 bits of data denoting the subframe ID (ID code). More specifically, the HOW words of subframes 1 to 5 shown in FIG. 2A respectively contain an ID code of 001, 010, 011, 100, 101.

A GPS receiver can generally get the GPS time information by acquiring the week number carried in subframe 1 and the HOW word (Z count) contained in subframes 1 to 5. However, if the GPS receiver has previously acquired the week number and internally keeps the time past from when the week number was acquired, the current week number value of the GPS satellite can be acquired without again acquiring the week number value. Therefore, if the GPS receiver can acquire the Z count, the current time not including the date can be known. As a result, the GPS receiver normally acquires only the Z count as the current time information.

Note that the TLM word, HOW word (Z count), satellite correction data, ephemeris, and almanac data are examples of satellite information.

Signal reception in the timekeeping mode in which the timekeeping process executes means the GPS wristwatch 1 acquires the Z count, which is time information. The Z count can be acquired from a single GPS satellite 5. Because the Z count data is carried in each subframe, it is transmitted every 6 seconds.

As a result, during signal reception in the timekeeping mode, the GPS wristwatch 1 locks onto at least one satellite, the reception time required to acquire one Z count value is at most 6 seconds, the information that can be acquired is the Z count, and the ephemeris and almanac data need not be acquired. The required reception time is therefore short because the Z count can be acquired in 6 seconds and reception can be completed in a short time of 12 to 18 seconds even if two or three Z counts are acquired to verify the received data.

Therefore, because acquiring the Z count is therefore sufficient in the timekeeping mode, the effect of signal noise, for example, is small even when receiving a satellite signal with low signal strength, and the Z count can be acquired with a high degree of reliability.

Signal reception in the positioning mode, however, means that ephemeris data containing the orbit information of a particular GPS satellite 5 (positioning information) must be received from at least three satellites. This is because ephemeris data must be acquired from three or more GPS satellites 5 for positioning. Because the ephemeris data is carried in subframes 2 and 3, the shortest time required to acquire ephemeris data (to receive subframes 1 to 3) for one satellite is 18 seconds. Therefore, if plural GPS satellites 5 are locked onto and signals are received simultaneously, approximately 30 seconds to 1 minute is required from a cold start in which no almanac data is stored locally to receive the ephemeris data and calculate and acquire the current location.

As a result, reception in the positioning mode means a process that locks onto at least three satellites, requires approximately 30 seconds to 1 minute for reception, acquires the Z count (time information) and ephemeris data, and does not receive the almanac data. In the positioning mode, therefore, the satellite signal reception time is longer than in the timekeeping mode, and receiving satellite signals with a high degree of reliability becomes difficult if the signal strength deteriorates during reception. As a result, satellite signals with high signal strength and high reliability are preferably received in the positioning mode.

Circuit Configuration of a GPS Wristwatch

Figure 3:
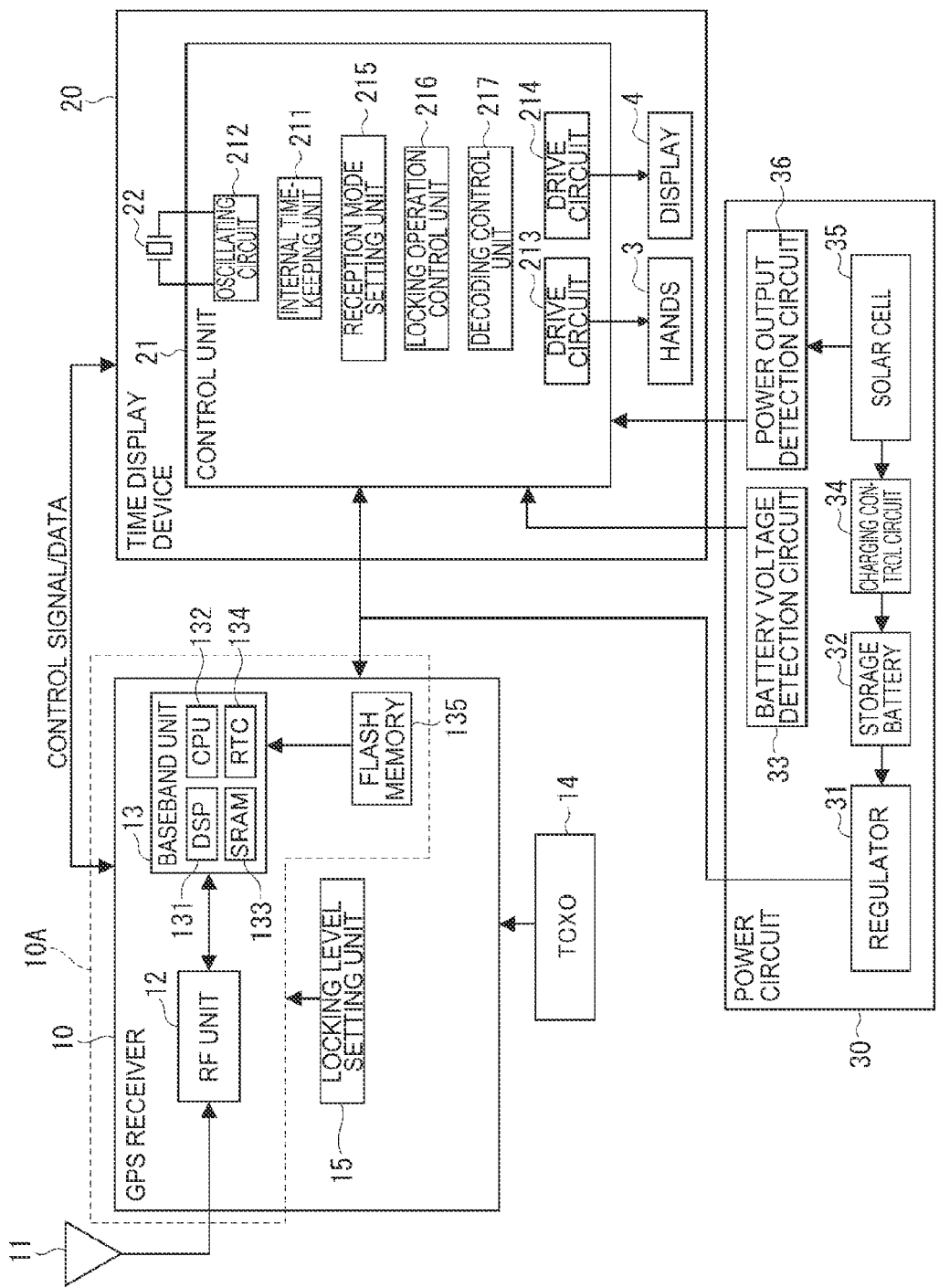
FIG. 3 is a block diagram illustrating the circuit configuration of the GPS wristwatch.

FIG. 3 is a block diagram showing the circuit configuration of an GPS wristwatch 1 according to the first embodiment of the invention.

The GPS wristwatch 1 has a GPS receiver 10, GPS antenna 11, time display device 20, and power circuit 30.

GPS Receiver Configuration

The GPS receiver 10 has a GPS antenna 11. The GPS antenna 11 is an antenna for receiving satellite signals from plural GPS satellites 5.

The GPS receiver 10 includes a radio frequency (RF) unit 12, a baseband unit 13, a locking level setting unit 15, and flash memory 135. The RF unit 12, baseband unit 13, and flash memory 135 embody the reception unit 10A of the invention.

RF Unit Configuration

The RF unit 12 is a typical GPS receiver including a down converter that converts high frequency satellite signals to intermediate frequency band signals, and an A/D converter that converts the analog intermediate frequency band signals to digital signals. The RF unit 12 therefore converts the received satellite signals to digital signals, and outputs the digital signals to the baseband unit 13.

Figure 4:
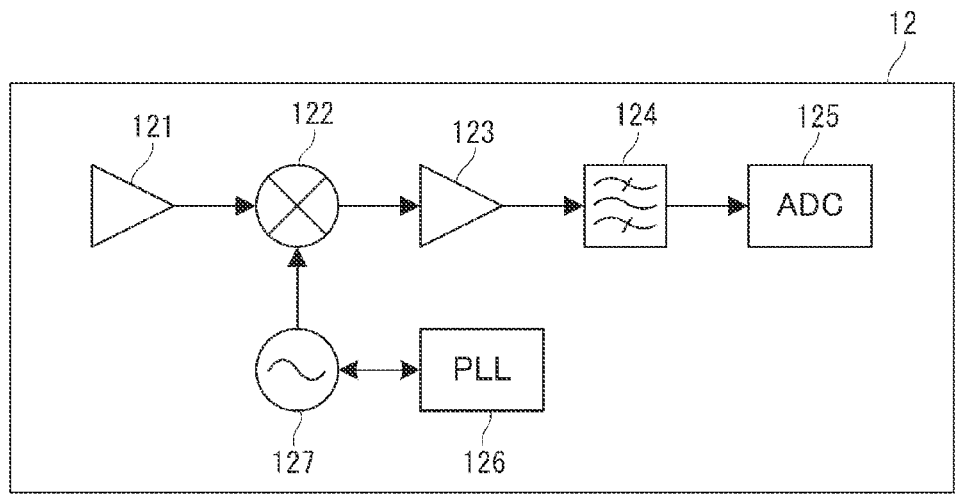
FIG. 4 illustrates the configuration of the RF unit in the GPS wristwatch.

FIG. 4 illustrates the configuration of the RF unit 12.

The RF unit 12 includes a LNA (low noise amplifier) 121, mixer 122, IF (intermediate frequency) amplifier 123, IF filter 124, A/D converter 125, PLL (phase-locked loop) circuit 126, and VCO (voltage controlled oscillator) 127.

Satellite signals received through the GPS antenna 11 are amplified by the LNA 121, then mixed by the mixer 122 with the clock signal output by the VCO 127, and down-converted to a signal in the intermediate frequency band. The IF signal mixed by the mixer 122 passes through the IF amplifier 123 and IF filter 124, and is converted to a digital signal by the A/D converter 125. The LNA 121 is the amplifier of the invention that amplifies the satellite signals. The amplifier of the invention may alternatively comprise the LNA 121 and the IF amplifier 123.

Baseband Unit Configuration

The baseband unit 13 includes a DSP (digital signal processor) 131, CPU (central processing unit) 132, SRAM (static random access memory) 133, and RTC (real-time clock) 134. A temperature compensated crystal oscillator (TCXO) 14 is also connected to the GPS receiver 10, and flash memory 135 is connected to the baseband unit 13.

The temperature compensated crystal oscillator (TCXO) 14 generates a reference clock signal of a substantially constant frequency regardless of temperature.

Time zone information, for example, is stored in flash memory 135. The time zone information defines time difference data for multiple geographical regions.

The baseband unit 13 processes demodulating (decoding) the baseband signal from the digital signal (intermediate frequency band signal) output by the RF unit 12.

To lock onto a satellite signal, the base band unit 13 executes a process that generates a local code of the same pattern as each C/A code, and correlates the local codes to the C/A code contained in the baseband signal. The baseband unit 13 functions as a correlation unit of the invention.

The baseband unit 13 then adjusts the timing when the local code is generated to find the peak correlation to each local code, and when the correlation equals or exceeds a specific threshold value, confirms synchronization with the GPS satellite 20 matching the local code (that is, confirms locking onto the satellite signal from a GPS satellite 5).

Note that the GPS system uses a CDMA (Code Division Multiple Access) method whereby all GPS satellites 5 transmit satellite signals on the same frequency using different C/A codes. A GPS satellites 5 that can be locked onto can therefore be found by identifying the C/A code contained in the received satellite signal. More specifically, GPS satellites 5 can be found by executing a correlation process using the PRN code that is set for each GPS satellite 5.

This embodiment of the invention uses a sliding correlation method as the correlation method, which is executed primarily by the DSP 131.

Figure 5:
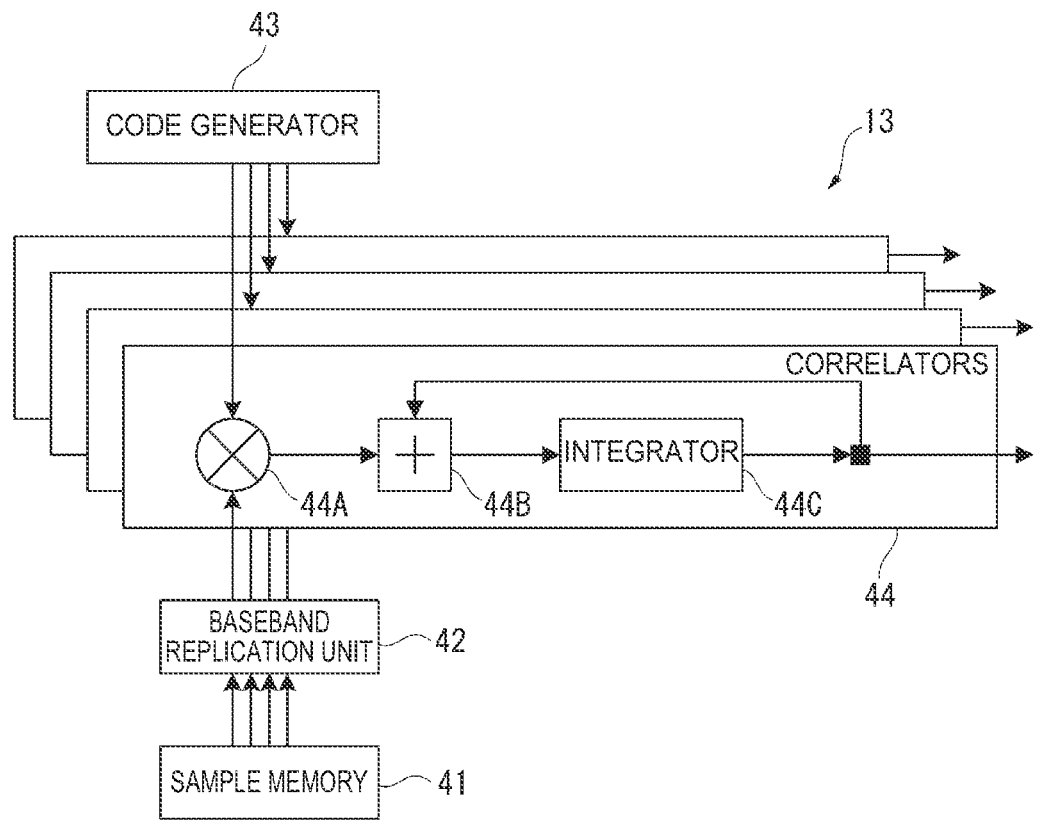
FIG. 5 describes the function of the baseband unit in the GPS wristwatch.

FIG. 5 describes the function of the baseband unit 13.

The baseband unit 13 includes sample memory 41, a baseband replication unit 42, a code generator 43, and a plurality of correlators 44.

Sampling data acquired by sampling the digital signal outputs from the RF unit 12 is stored in the sample memory 41.

The baseband replication unit 42 replicates the sampling data stored in the sample memory 41, and outputs a replicated baseband signal to the correlators 44.

The code generator 43 generates local codes identical to the C/A code patterns of the GPS satellite 5, and outputs to the correlators 44.

The replicated baseband signal output from the baseband replication unit 42, and the local patterns produced by the code generator 43, are input to the multiplier 44A of the correlators 44, and a correlation value is calculated. The correlation value is input to an adder 44B, and the correlation values for one period of the C/A code are integrated by the integrator 44C. If the integral is greater than a predetermined threshold value, the C/A code of the received satellite signal and the local code generated on the GPS receiver 10 side match.

In order for the baseband unit 13 to correlate efficiently with the satellite signal from the GPS satellite 5, the code generator 43 generates multiple signals and a plurality of correlators 34 are operated simultaneously in order to complete the signal correlation in a single operation. The time required for the correlation process can therefore be shortened because the baseband unit 13 only needs to execute the correlation process once.

The frequency of the satellite signals received by the GPS receiver 10 varies due to the Doppler effect. More specifically, the frequency of satellite signals transmitted from a GPS satellite 5 near the zenith relative to the GPS wristwatch 1 is the same as the transmission frequency, but the frequency of satellite signals transmitted from a GPS satellite 5 approaching the GPS wristwatch 1 becomes higher than the transmission frequency, and the frequency of satellite signals transmitted from a GPS satellite 5 moving away becomes lower than the transmission frequency.

The baseband unit 13 therefore searches for the frequency of the satellite signal by a correlation process that sequentially changes the frequency of the local code by a specific frequency increment, such as 50 Hz, through a set frequency band.

The baseband unit 13 is configured so that the satellite signal locking performance can be set in plural stages. More specifically, in this embodiment the baseband unit 13 is configured so that the number of searches per unit time of the satellite signal frequency in the correlation process can be set in plural stages. The number of searches can be set in plural stages by changing the time interval at which the frequency of the local code is changed.

In this embodiment, the locking performance can be set in two stages, a first level (level 1; a high level in this embodiment) and a second level (level 2; low level in this embodiment) that is lower than the first level.

When the locking performance is set to level 1, the number of searches is set to a first search count (a high search count in this embodiment), and the baseband unit 13 searches 63 frequencies every 10 msec. The time interval is therefore $10/63$ msec (approximately 0.16 msec).

When the locking performance is set to level 2, the number of searches is set to a second search count (a low search count in this embodiment), and the baseband unit 13 searches 32 frequencies every 10 msec. The time interval is therefore $10/32$ msec (approximately 0.31 msec).

The search time can be shorted by increasing the number of searches, that is, if the search speed is high, but the processing load of the baseband unit 13 increases and the peak consumption current increases. In other words, if the number of searches is small, that is, if the search speed is low, the search time increases and the peak current consumption can be decreased.

When a satellite signal is locked onto by the search, the baseband unit 13 mixes the baseband signal with the local code of the same C/A code as the GPS satellite 5 that was locked, demodulates (decodes) the navigation message, and acquires and stores satellite information such as the orbit information the GPS time information contained in the navigation message in SRAM 133.

Operation of the baseband unit 13 is synchronized to the reference clock signal output by the temperature compensated crystal oscillator (TCXO) 14. The RTC 134 generates the timing for processing the satellite signal. The RTC 134 counts up at the reference clock signal output from the TCXO 14.

Locking Level Setting Unit

The GPS receiver 10 also has a locking level setting unit 15 for setting the locking performance of the baseband unit 13 according to the reception mode.

The reception modes of the GPS receiver 10 in this embodiment of the invention include an automated timekeeping mode in which the reception process is executed in the timekeeping mode when an automatic reception condition is met; a manual timekeeping mode in which the reception process is executed in the timekeeping mode when a button 6, for example, is pressed for 3=>6 seconds (first operation); and a positioning mode in which the reception process is executed in response to a button 6, for example, being pressed for 6 seconds or more (second operation).

When the reception mode is set to the manual reception mode or the positioning mode, the locking level setting unit 15 sets the locking performance to level 1, and sets the locking performance to level 2 when the reception mode is set to the automated timekeeping mode.

Configuration of the Time Display Device

As shown in FIG. 3, the time display device 20 includes a control unit 21 and a crystal oscillator 22.

The control unit 21 includes an internal timekeeping unit 211, an oscillating circuit 212, drive circuits 213 and 214, a reception mode setting unit 215, a locking operation control unit 216, and a decoding control unit 217, and controls various operations.

The internal timekeeping unit 211 keeps and stores internal time information. This internal time information is information about the time kept internally by the GPS wristwatch 1. The internal timekeeping unit 211 updates the internal time information based on the reference clock signal generated by the crystal oscillator 22 and oscillating circuit 212. The internal time information can therefore be updated and the hands 3 moved continuously even when the power supply to the GPS receiver 10 is stopped.

Drive circuit 213 controls moving the hands 3. Drive circuit 214 controls displaying information on the display 4.

The reception mode setting unit 215 sets the operating mode of the GPS receiver 10 to the manual timekeeping mode described above when the user performs the first operation; sets the reception mode to the positioning mode described above when the user performs the second operation; and sets the reception mode to the automated timekeeping mode when neither the first operation or second operation is performed.

In the positioning mode, the GPS wristwatch 1 acquires the Z count and ephemeris parameters from at least three satellite signals as described above, and executes a position calculation process that calculates the current position of the GPS wristwatch 1 (the current position information in the invention).

In the timekeeping mode and the automated timekeeping mode, the GPS wristwatch 1 acquires only the Z count from at least one satellite signal and executes a time correction process based on the acquired Z count as described above.

The locking operation control unit 216 and decoding control unit 217 control the GPS receiver 10 to run the reception process. More specifically, the locking operation control unit 216 sends a control signal to the GPS receiver 10, controls the reception operation of the GPS receiver 10, and controls locking onto a satellite signal in particular.

The decoding control unit 217 also controls the reception operation of the GPS receiver 10, and controls particularly the decoding process of the baseband unit 13.

When the reception mode is set to the manual timekeeping mode or the automated timekeeping mode, the locking operation control unit 216 and decoding control unit 217 control operation of the GPS receiver 10, acquire the GPS time information including the Z count from the satellite signal, correct the internal time information based on the GPS time information, and update the internal time information kept by the internal timekeeping unit 211.

At this time, the locking operation control unit 216 and decoding control unit 217 calculate the time difference between the GPS time based on the Z count from the acquired GPS time information, and the internal time kept by the internal timekeeping unit 211, and if the calculated time difference is within a specific value, adjust the internal time information of the internal timekeeping unit 211. This specific value is set appropriately based on the time past from when the last successful timekeeping mode to the present.

More specifically, if the internal time information is updated based on the reference clock signal generated by the crystal oscillator 22 and oscillating circuit 212, the internal time may vary by +/−0.5 s per day from the correct time. Therefore, the internal time may deviate from the correct time by up to +/−0.5 s times the number of days from the last time the time was adjusted until the time is adjusted in the current timekeeping mode. However, if there is noise in the satellite signal and accurate GPS time information could not be acquired, the difference between the internal time and the GPS time becomes greater than the internal time deviation.

Whether the difference between the internal time of the internal timekeeping unit 211 and the GPS time is due to the normal deviation in the internal time or is due to GPS time information acquired from an inappropriate satellite signal can therefore be determined by setting (0.5 s×number of days) as the specific value. Therefore, when the difference between the internal time and the GPS time is less than or equal to the specific value, the locking operation control unit 216 and decoding control unit 217 determine the difference is due to the normal deviation in the internal time, and update the internal time information of the internal timekeeping unit 211 based on the GPS time.

In the positioning mode, the locking operation control unit 216 and decoding control unit 217 control operation of the GPS receiver 10 and correct and store the internal time information in the internal timekeeping unit 211 based on the GPS time information, the UTC parameter, and the time zone data acquired from the flash memory 135 based on the location information.

When the internal time information is corrected, the control unit 21 adjusts the time displayed by the hands 3 through the drive circuit 213. The control unit 21 also appropriately displays the time and location information on the display 4 through the drive circuit 214.

Power Supply Device Configuration

The power circuit 30 includes a regulator 31, storage battery 32, battery voltage detection circuit 33, charging control circuit 34, solar cell 35, and a power output detection circuit 36 embodying a power output detection means.

The storage battery 32 supplies drive power to the GPS receiver 10 and time display device 20, for example, through the regulator 31.

The battery voltage detection circuit 33 is driven by a control signal from the control unit 21 and monitors the voltage of the storage battery 32.

The charging control circuit 34 is disposed between the solar cell 35 and the storage battery 32, and controls charging the storage battery 32 by current supplied from the solar cell 35.

The power output detection circuit 36 detects the power output of the solar cell 35, and outputs a output power detection signal representing the power output to the control unit 21 of the time display device 20.

The control unit 21 automatically executes the reception process in the timekeeping mode when the power output of the solar cell 35 is detected to equal or exceed an environment detection threshold as described further below.

Reception Process

Figure 6:
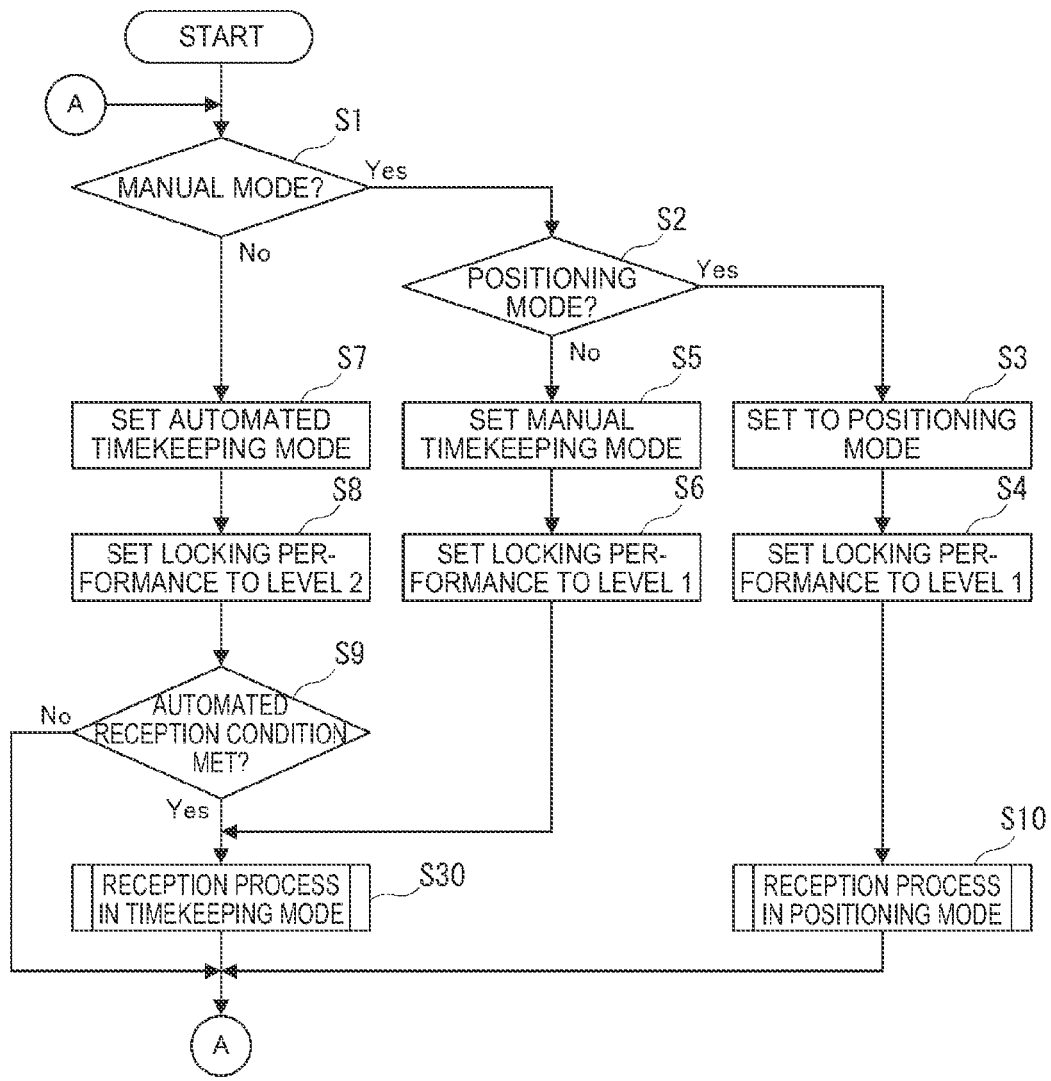
FIG. 6 is a flow chart describing the satellite signal reception process in a first embodiment of the invention.

The reception process of the GPS wristwatch 1 according to the first embodiment of the invention is described below with reference to the flow chart in FIG. 6.

The GPS wristwatch 1 first determines if the user performed the first operation or the second operation, that is, if a manual reception mode was entered by the user (step S1).

If the control unit 21 of the time display device 20 determines in step S1 that a manual reception mode was selected, it next determines if the second operation was performed, that is, if the positioning mode was selected (step S2).

If in step S2 the control unit 21 determines the positioning mode was selected, that is, if step S2 returns Yes, the reception mode setting unit 215 sets the reception mode to the positioning mode (step S3).

Next, the locking level setting unit 15 of the GPS receiver 10 sets the satellite signal locking performance of the baseband unit 13 to level 1 (step S4). More specifically, the locking level setting unit 15 sets the number of searches per unit time of the satellite signal frequency in the correlation process to a first search count.

Next, the locking operation control unit 216 and decoding control unit 217 of the control unit 21 output a control signal to the GPS receiver 10 to execute the satellite signal reception process in the positioning mode (step S10). After step S10 executes control returns to step S1 to wait for user input.

If in step S2 the control unit 21 determines the manual timekeeping mode was selected, that is, if step S2 returns No, the reception mode setting unit 215 sets the reception mode to the manual timekeeping mode (step S5), and the locking level setting unit 15 sets the locking performance to level 1 (step S6). Next, the locking operation control unit 216 and decoding control unit 217 of the control unit 21 output a control signal to the GPS receiver 10 to execute the satellite signal reception process in the timekeeping mode (step S30).

If the control unit 21 of the time display device 20 determines in step S1 that a manual reception mode was not selected, that is, if step S1 returns No, the reception mode setting unit 215 sets the reception mode to the automated timekeeping mode (step S7).

The locking level setting unit 15 then sets the locking performance to level 2 (step S8). More specifically, the locking level setting unit 15 sets the number of searches per unit time of the satellite signal frequency in the correlation process to the second search count.

In the automated timekeeping mode, the control unit 21 determines if an automated reception condition is met (step S9). The automated reception conditions in this embodiment of the invention include a scheduled reception condition and a light detection condition.

A time for starting automated reception is previously set in the scheduled reception condition. The control unit 21 references the internal time information of the internal timekeeping unit 211, and executes the automated reception process if the internal time has reached the preset scheduled time, such as 7:00.

Whether the power output detected by the power output detection circuit 36 is greater than or equal to a previously set environment detection threshold is set as a light detection condition. The environment detection threshold to a value differentiating between the amount of light when the solar cell 35 is exposed to direct sunlight when outdoors or beside a window indoors, and the amount of light when the solar cell 35 is indoors and exposed only to indoor lighting, thereby enabling detecting if the GPS wristwatch 1 is in an environment where satellite signals can be received. By using the amount of light detected by the power output detection circuit 36 being greater than or equal to the environment detection threshold as the automated reception condition, the automated reception process can be executed in an environment where the GPS wristwatch 1 can easily receive satellite signals.

Therefore, step S9 returns Yes when the internal time information reaches the set scheduled time, and when the amount of light detected by the power output detection circuit 36 is greater than or equal to the environment detection threshold. However, to prevent power consumption from increasing, the automated reception process is limited to executing once a day. As a result, once Yes is returned based on either the scheduled reception condition or the light detection condition on a particular day, the control unit 21 returns No in step S9 until the next day.

If step S9 returns Yes, the locking operation control unit 216 and decoding control unit 217 of the control unit 21 outputs a control signal to the GPS receiver 10 to execute the satellite signal reception process in the timekeeping mode in step S30. If step S9 returns No, and if step S30 executes, the control unit 21 returns to step S1 to wait for user input.

Reception Process in the Positioning Mode

Figure 7:
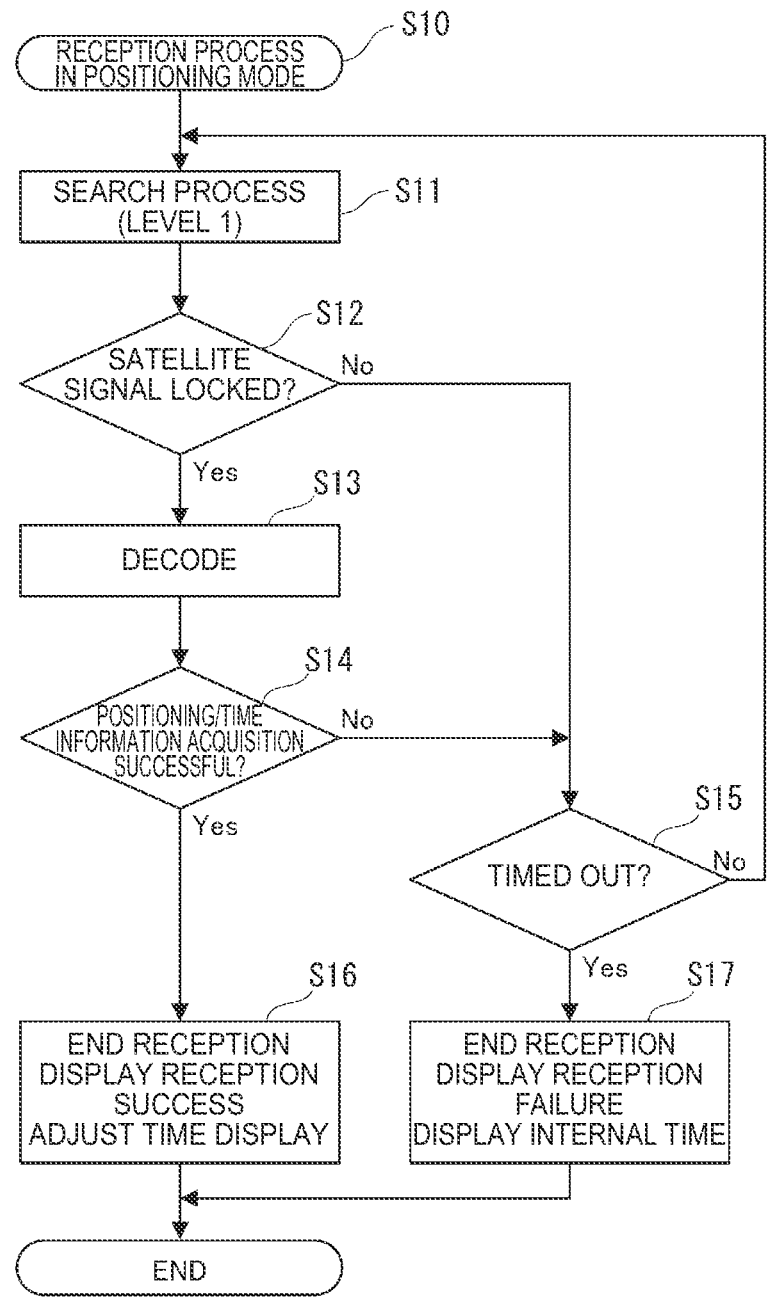
FIG. 7 is a flowchart describing reception in the positioning mode of the reception process.

The reception process in the positioning mode in step S10 is described next with reference to the flow chart in FIG. 7.

In the reception process in the positioning mode, the baseband unit 13 sets the locking performance to level 1, searches for satellite signals transmitted from GPS satellites 5, and executes the satellite locking operation (search process) to lock onto satellite signals (step S11).

The baseband unit 13 detects the signal strength (SNR) of the satellite signals locked onto in the search process, determines if the detected signal strength is greater than or equal to a signal reception threshold, and determines if a satellite signal was locked (step S12). Therefore, the baseband unit 13 determines a satellite signal was locked when the signal strength is greater than or equal to the signal reception threshold (step S12 returns Yes).

If Yes is returned in step S12, the baseband unit 13 applies a decoding process to the satellite signal locked by the baseband unit 13 (step S13).

The baseband unit 13 then determines if acquiring the positioning information and time information was successful (step S14).

If a satellite signal could not be locked onto in the search process (step S12 returns NO), and if acquiring the positioning and time information is not successful because three or more satellite signals could not be found (step S14 returns NO), the baseband unit 13 determines if the reception process timed out (step S15).

If step S15 returns No, the process returns to step S11. More specifically, steps S11 to S15 repeat until the condition for terminating satellite signal reception is met and Yes is returned in step S14 or Yes is returned in step S15.

If three or more satellite signals are locked, decoded, positioning and time information acquisition are successful, and step S14 returns Yes, the control unit 21 executes the process for when reception is successful (step S16). More specifically, the control unit 21 ends the reception operation of the GPS receiver 10, displays information that reception was successful on the display 4, and corrects the internal time information and updates the internal timekeeping unit 211 based on the GPS time information, UTC parameter, and the time zone data acquired from the flash memory 135 based on the positioning information. When the internal time information is updated, the control unit 21 adjusts the time indicated by the hands 3 through the drive circuit 213. The control unit 21 also appropriately displays the time and location information on the display 4 through the drive circuit 214.

If step S15 returns Yes, the control unit 21 ends the satellite signal reception operation of the GPS receiver 10. In this event, the time display device 20 executes a process to display information indicating that reception failed on the display 4, for example, and display the internal time kept by the internal timekeeping unit 211 with the hands 3 (step S17).

Reception Process in the Timekeeping Mode

Figure 8:
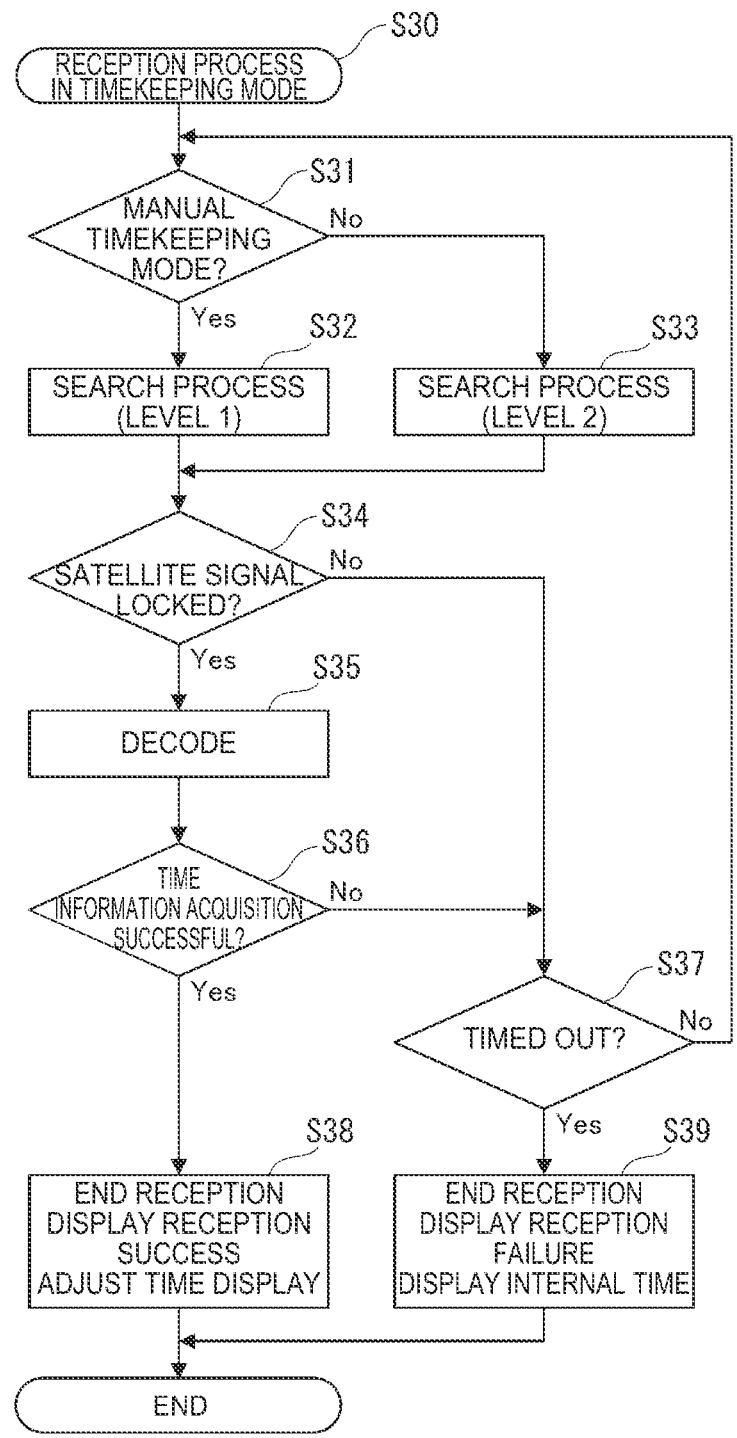
FIG. 8 is a flow chart describing reception in the timekeeping mode of the reception process.

The reception process in the timekeeping mode in step S30 is described next with reference to the flow chart in FIG. 8.

Of steps S31 to S39 in the timekeeping mode reception process of step S30, steps S34, S35, S37-S39 are identical to steps S12, S13, S15-S17 in the positioning mode reception process of step S10, and further description thereof is omitted.

When step S31 returns Yes, that is, when the manual timekeeping mode is selected, the baseband unit 13 sets the locking performance to level 1, searches for satellite signals transmitted from GPS satellites 5, and executes the satellite locking operation (search process) to lock onto satellite signals (step S32).

If step S31 returns No, that is, when the automated timekeeping mode is selected, the baseband unit 13 sets the locking performance to level 2, searches for satellite signals transmitted from GPS satellites 5, and executes the satellite locking operation (search process) to lock onto satellite signals (step S33).

After the search process of step S32 or the search process of step S33, whether or not a satellite signal was locked is determined in step S34.

Because there is no need to acquire positioning information, step S34 determines only if acquiring time information was successful.

The difference between power consumption when the satellite signal locking performance is set to level 1 and when it is set to level 2 is described next.

Power consumption when reception fails is described first.

Figure 9:
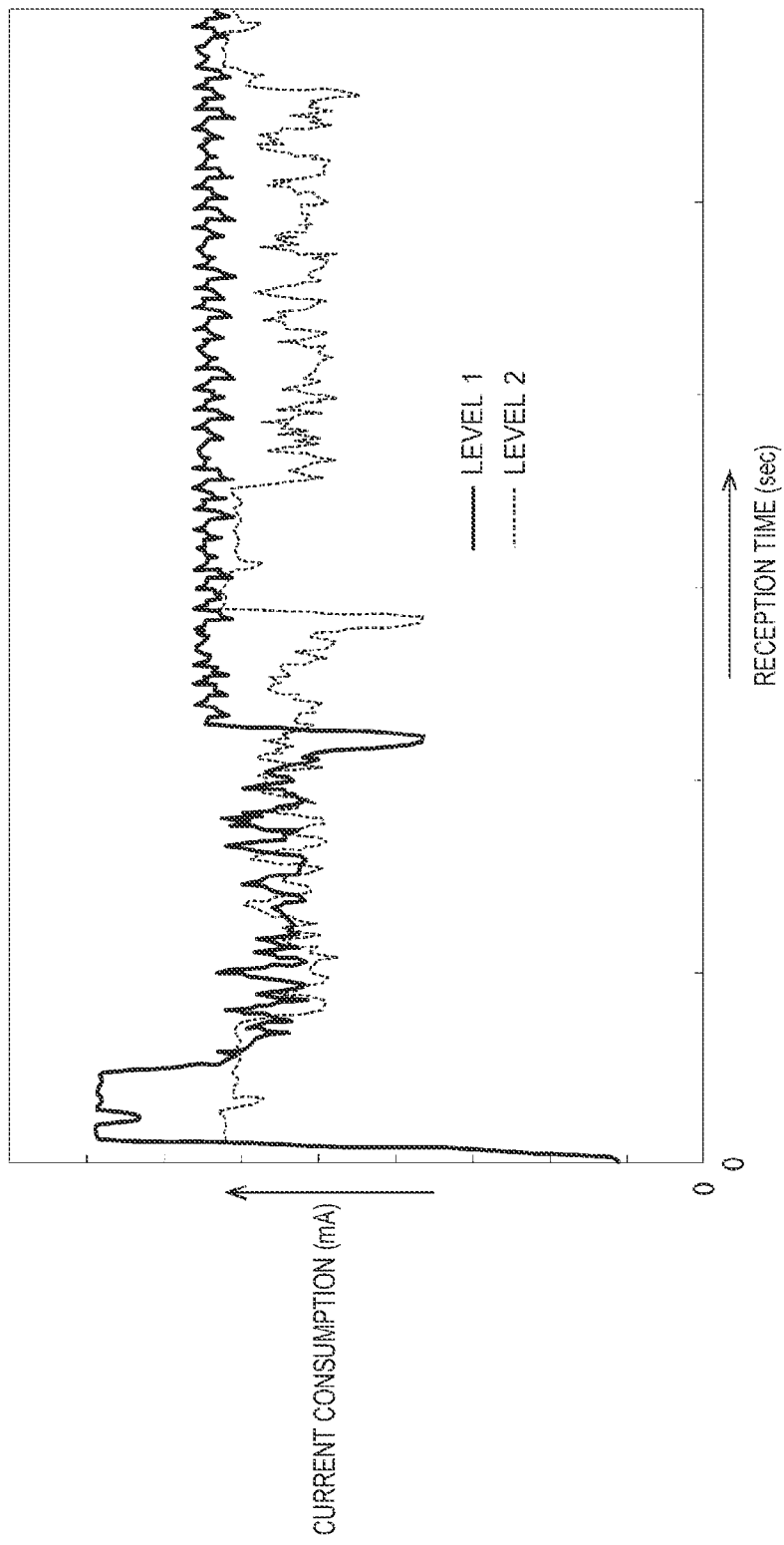
FIG. 9 illustrates the change in consumption current during reception in the timekeeping mode when reception fails.

FIG. 9 is a graph illustrating change in current consumption in the reception process in the timekeeping mode when reception fails.

As shown in FIG. 9, when reception fails, the search process continues until operation times out. The peak current consumption is lower and power consumption by the reception process (the integral of current consumption) is lower in the reception process when the locking performance is set to level 2 than when the locking performance is set to level 1.

Power consumption when reception is successful is described next.

Figure 10:
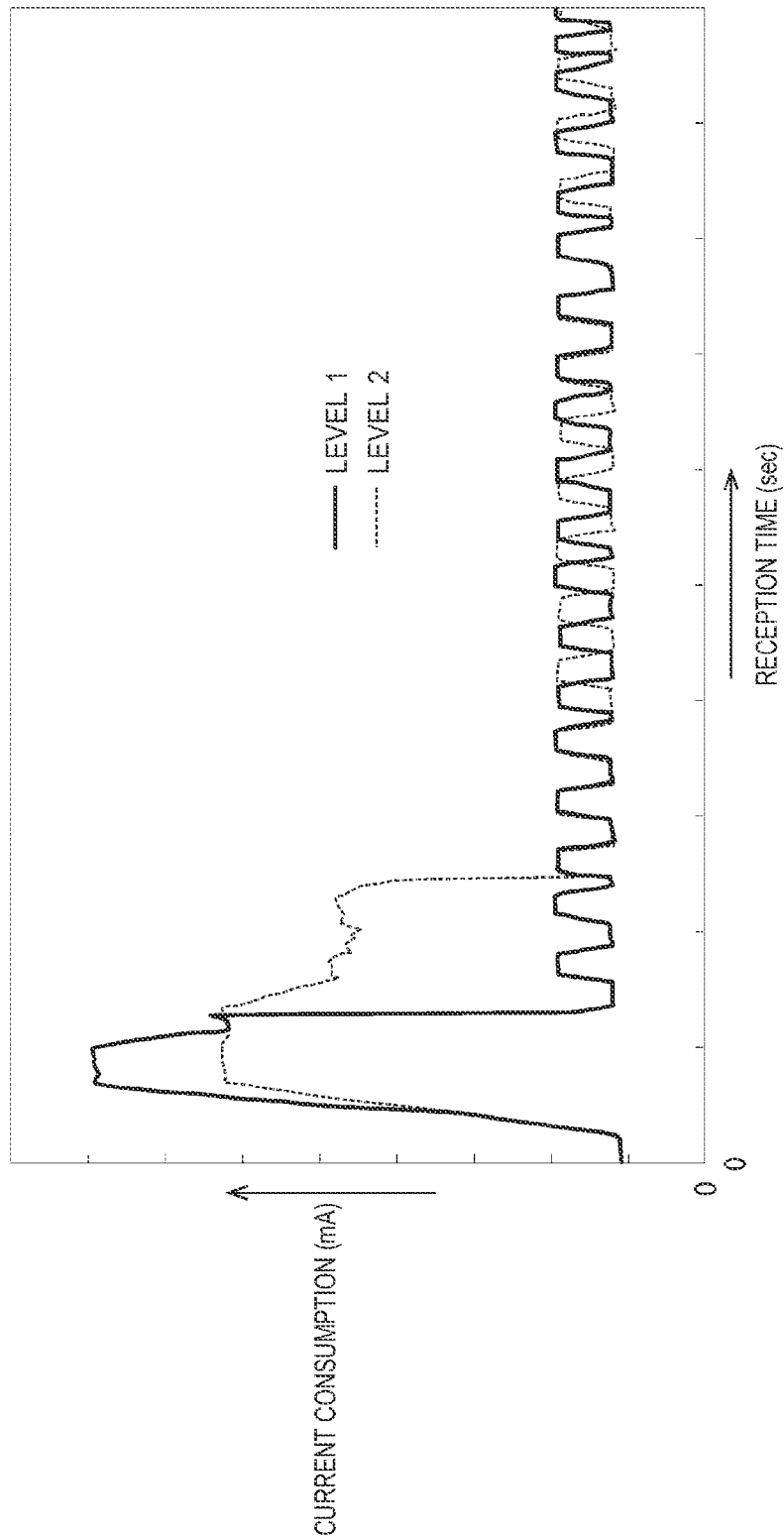
FIG. 10 illustrates the change in consumption current during reception in the timekeeping mode when reception succeeds.

FIG. 10 is a graph illustrating change in current consumption in the reception process in the timekeeping mode when reception is successful.

As shown in FIG. 10, the peak current consumption is higher in the reception process when the locking performance is set to level 1 than when the locking performance is set to level 2, but reception succeeds, the search process ends, and current consumption drops sooner. More specifically, because the search process takes less time (approximately half), power consumption (the integral of current consumption) by the reception process is low.

Effect of Embodiment 1

This embodiment of the invention sets the locking performance to level 2 when the reception mode is set to the automated timekeeping mode. The average power consumption of the reception process in the automated timekeeping mode can therefore be reduced compared with when the locking performance is set to level 1.

More specifically, if the locking performance is set to level 2 in the automated reception process because of the relatively high possibility that satellite signal locking and receiving will fail, the peak current consumption can be reduced and average power consumption by the reception process can be reduced compared with when the locking performance is set to level 1.

Furthermore, by setting the locking performance to level 1 when the reception mode is set to the manual timekeeping mode or the positioning mode, average power consumption by the reception process can be reduced compared with when the locking performance is set to level 2 in the manual timekeeping mode and positioning mode.

More specifically, the average power consumption of the reception process can be reduced in the manual reception mode even if the peak current consumption is high because the reception time is shortened by increasing the locking performance.

By thus setting the satellite signal locking performance according to the reception mode, this embodiment of the invention can reduce the average power consumption of the reception process in each reception mode.

Furthermore, because the satellite signal locking performance of the baseband unit 13 is changed by changing the number of searches per unit time of the frequency of the satellite signal in the correlation process, a common baseband unit can be used by simply changing the number of searches, and there is no need to greatly change the configuration of the baseband unit. Design-related costs can therefore be reduced.

Embodiment 2

A second embodiment of the invention is described next.

A GPS wristwatch according to the second embodiment of the invention differs from the GPS wristwatch 1 according to the first embodiment in being able to change the locking performance of the baseband unit 13 of the GPS receiver 10 in three levels, level 1, level 2, and level 3, the method whereby the locking level setting unit 15 sets the locking performance, and the reception process. Other aspects of this embodiment are the same as the first embodiment, and further description thereof is omitted.

The locking performance of the baseband unit 13 in this second embodiment can be changed in three stages, level 1, level 2, and a level 3 that is lower than level 2. The values of level 1 and level 2 are the same as level 1 and level 2 in the first embodiment.

When the locking performance is set to level 3, the number of searches per unit time of the frequency of the satellite signal in the correlation process is set to a third search count (a low search count in the invention), and the baseband unit 13 searches 16 frequencies per 10 ms. In other words, the time interval for changing the frequency of the local code is 10/16 (approx. 0.63) msec.

The automated timekeeping mode in this embodiment of the invention includes a light-based timekeeping mode in which the reception mode is executed in the timekeeping mode when the light detection condition described above is met, and a scheduled timekeeping mode in which the reception mode is executed in the timekeeping mode when the scheduled reception condition described above is met.

The locking level setting unit 15 sets the satellite signal locking performance to level 1 when the reception mode is set to the manual timekeeping mode and the positioning mode; sets the locking performance to level 2 when the reception mode is set to the light-based timekeeping mode; and sets the locking performance to level 3 when the reception mode is set to the scheduled timekeeping mode.

Reception Process

Figure 11:
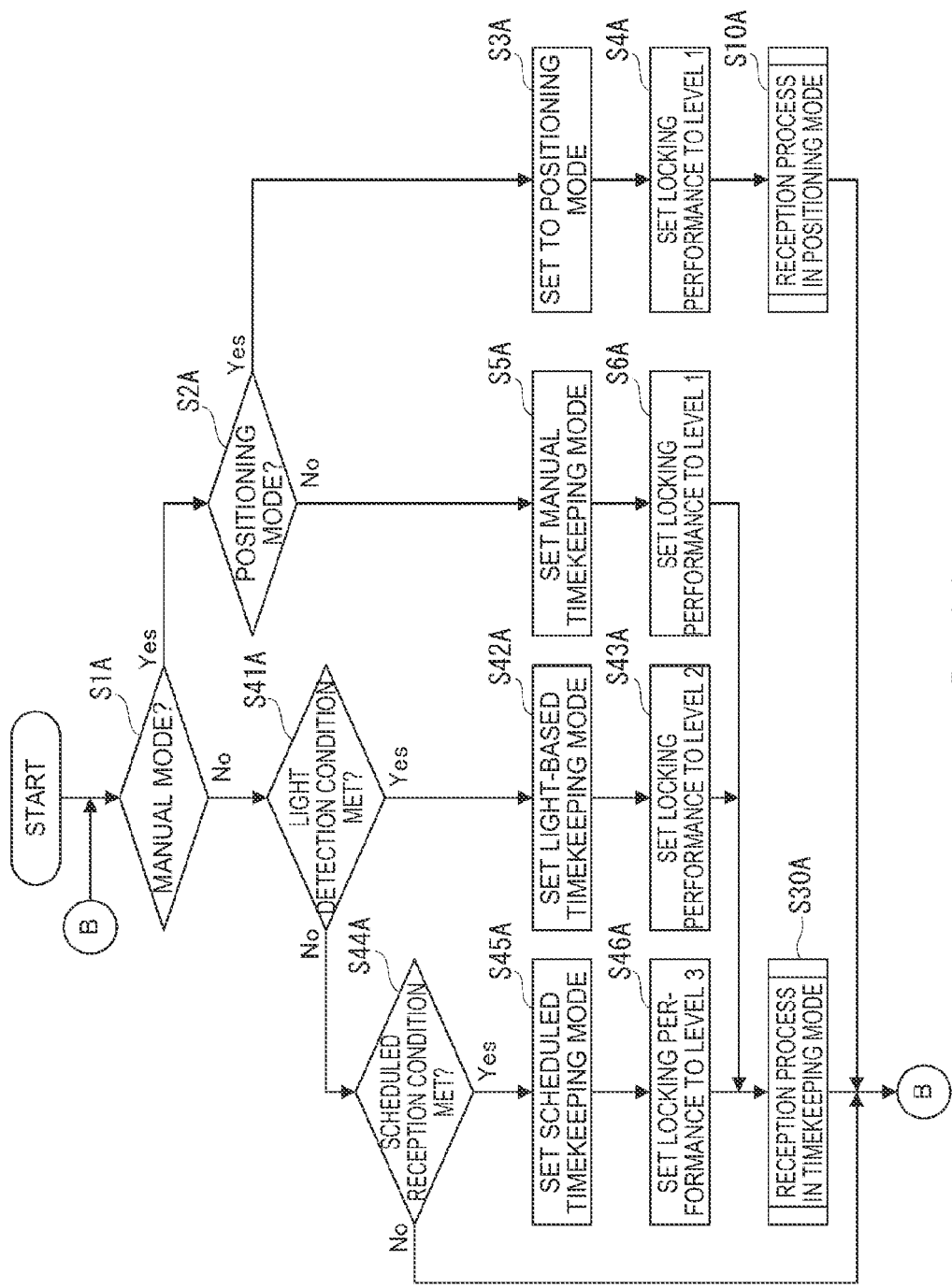
FIG. 11 is a flow chart describing the satellite signal reception process in a second embodiment of the invention.

FIG. 11 is a flow chart describing the reception process in the second embodiment of the invention.

Note that of steps S1A-S6A, S10A, S30A, S41A-S46A in the reception process of the second embodiment, steps S1A-S6A, S10A are the same as steps S1-S6, S10 in the reception process of the first embodiment, and further description thereof is omitted.

In the second embodiment, when step S1A returns No, the control unit 21 of the time display device 20 determines if the light detection condition is met (step S41A).

If step S41A returns Yes, the reception mode setting unit 215 sets the reception mode to the light-based timekeeping mode (step S42A), and the locking level setting unit 15 sets the satellite signal locking performance of the baseband unit 13 to level 2 (step S43A). The process then goes to step S30A.

If step S41A returns No, the control unit 21 determines if the scheduled reception condition is met (step S44A).

If step S44A returns Yes, the reception mode setting unit 215 sets the reception mode to the scheduled timekeeping mode (step S45A), and the locking level setting unit 15 sets the locking performance to level 3 (step S46A). More specifically, the locking level setting unit 15 sets the number of searches per unit time of the frequency of the satellite signal in the correlation process to the third search count.

After step S46A, and if step S44A returns No, the process goes to step S30A.

Reception Process in the Timekeeping Mode

Figure 12:
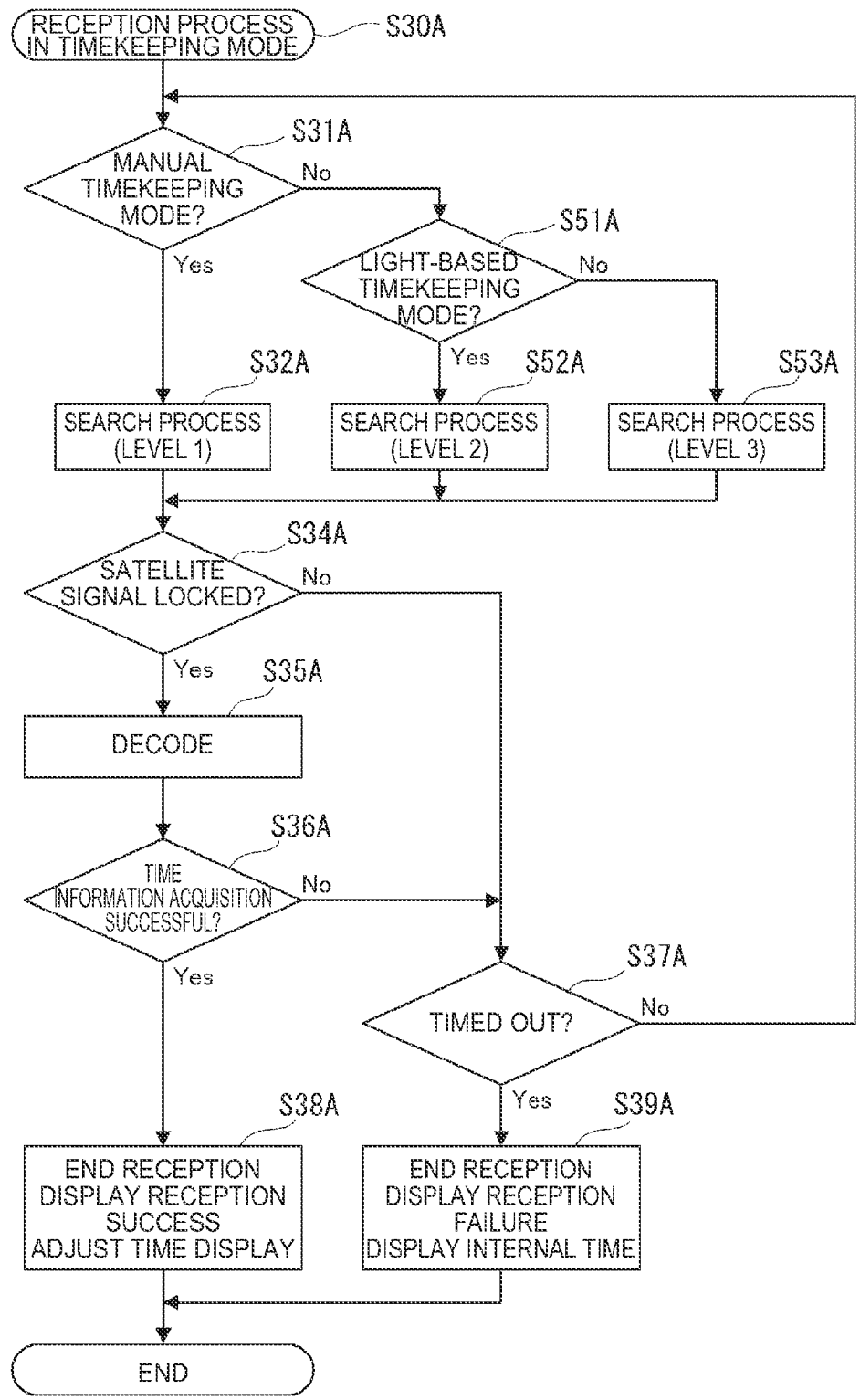
FIG. 12 is a flow chart describing reception in the timekeeping mode of the reception process in the second embodiment of the invention.

FIG. 12 is a flow chart describing the reception process in the timekeeping mode of step S30A.

Of steps S31A, S32A, S34A-S39A in the reception process in the timekeeping mode of step S30A, steps S31A, S32A, S34A-S39A are the same as steps S31, S32, S34-S39 in the timekeeping mode in the first embodiment, and further description thereof is omitted.

When step S31A returns No in the second embodiment, the baseband unit 13 determines if the set reception mode is the light-based timekeeping mode (step S51A).

If step S51A returns Yes, that is, if the light-based timekeeping mode is set, the baseband unit 13 sets the locking performance to level 2, searches for satellite signals transmitted from GPS satellites 5, and executes the satellite locking operation (search process) to lock onto satellite signals (step S52A). The process then goes to step S34A.

If step S51A returns No, that is, if the scheduled timekeeping mode is set, the baseband unit 13 sets the locking performance to level 3, searches for satellite signals transmitted from GPS satellites 5, and executes the satellite locking operation (search process) to lock onto satellite signals (step S53A). The process then goes to step S34A.

The difference in power consumption when the satellite signal locking performance is set to level 1, level 2, and level 3 is described next.

Power consumption when reception fails is described first.

Figure 13:
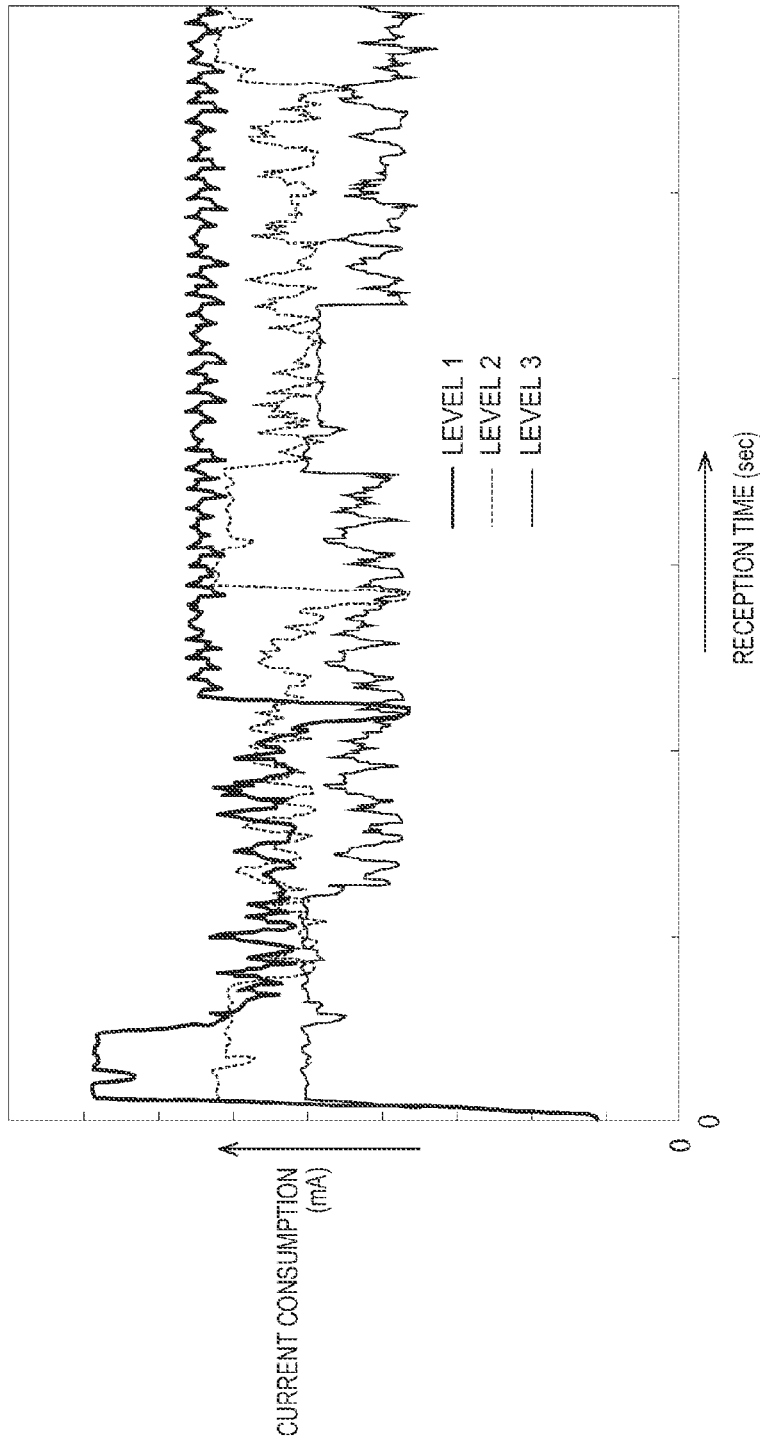
FIG. 13 illustrates the change in consumption current during reception in the timekeeping mode when reception fails in the second embodiment of the invention.

FIG. 13 is a graph illustrating change in current consumption in the reception process in the timekeeping mode when reception fails.

As shown in FIG. 13, when reception fails, the search process continues until operation times out. The peak current consumption is lower and power consumption by the reception process (the integral of current consumption) is lower in the reception process when the locking performance is set to level 3 than in the reception process when the locking performance is set to level 1 or level 2.

Power consumption when reception is successful is described next.

Figure 14:
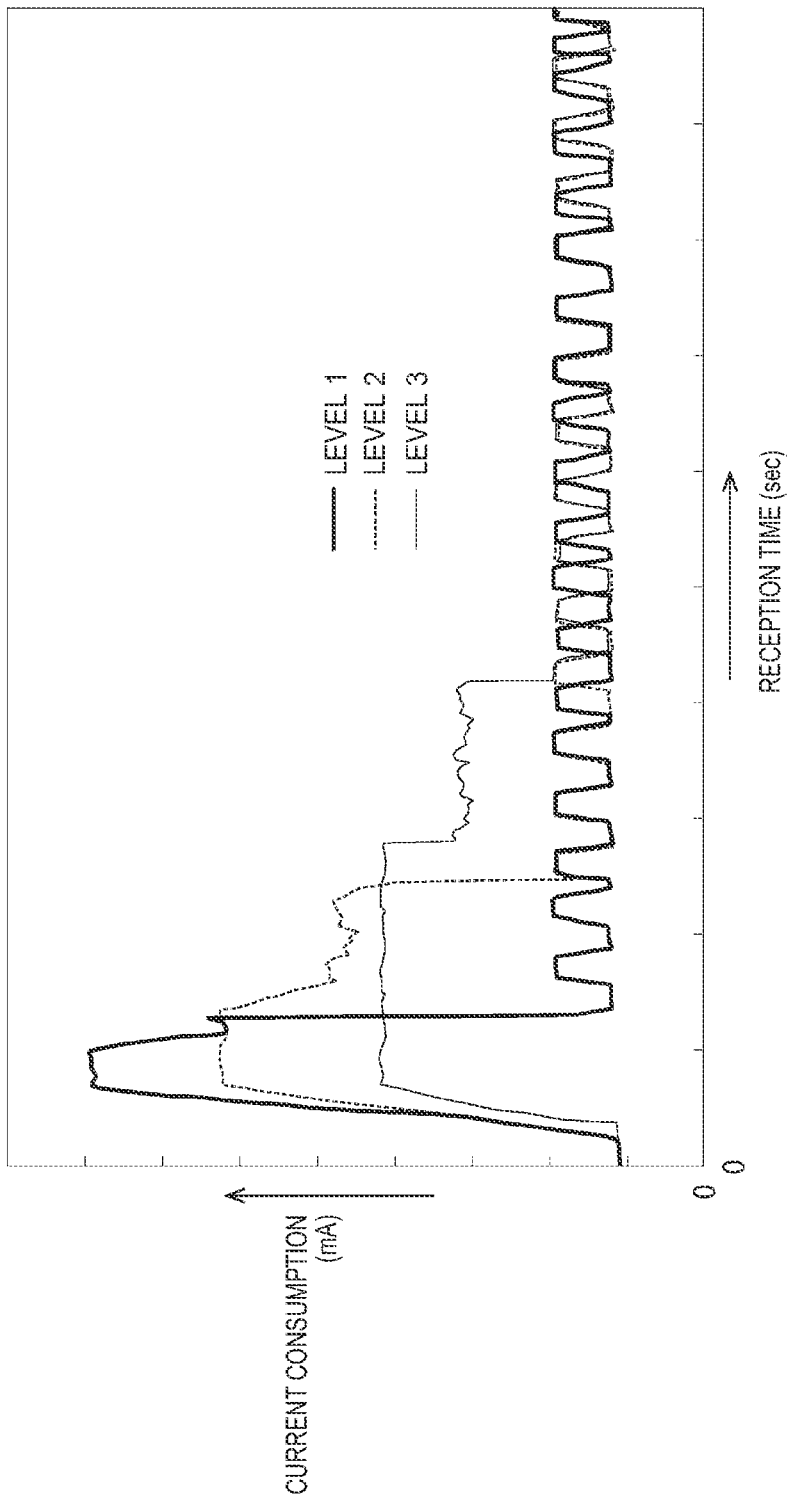
FIG. 14 illustrates the change in consumption current during reception in the timekeeping mode when reception succeeds in the second embodiment of the invention.

FIG. 14 is a graph illustrating change in current consumption in the reception process in the timekeeping mode when reception is successful.

As shown in FIG. 14, the peak current consumption is higher in the reception process when the locking performance is set to level 2 than when the locking performance is set to level 3, but reception succeeds, the search process ends, and current consumption drops sooner. More specifically, because the search process takes less time, power consumption (the integral of current consumption) by the reception process can be reduced.

Effect of Embodiment 2

When the reception mode is set to the light-based timekeeping mode in this embodiment, the satellite signal locking performance is set to level 2, and when the reception mode is set to the scheduled timekeeping mode, the locking performance is set to level 3, which is even lower than level 2. As a result, the average power consumption of the reception process in the automated timekeeping mode can be reduced.

More specifically, the reception process is executed in the light-based timekeeping mode in an environment in which satellite signals can be easily received. Successfully receiving satellite signals is more difficult in the scheduled timekeeping mode than in the light-based timekeeping mode, and the reception process often continues until operation times out.

As a result, by increasing the locking performance level in the light-based timekeeping mode compared with the scheduled timekeeping mode, satellite signals can be successfully locked and received more sooner, the reception process often ends in a short time, and power consumption by the reception process can be reduced. Furthermore, by reducing the locking performance level and increasing the peak current consumption in the scheduled timekeeping mode compared with the light-based timekeeping mode, power consumption by the reception process can often be reduced.

The average power consumption by the reception process in the automated timekeeping mode can therefore be further reduced by setting the locking performance of the light-based timekeeping mode to a higher level than the locking performance setting in the scheduled timekeeping mode, in other words by setting the locking performance level in the scheduled timekeeping mode lower than the locking performance level in the light-based timekeeping mode.

Embodiment 3

The method of setting the satellite signal locking performance in the GPS wristwatch according to the third embodiment of the invention differs from the method used by the GPS wristwatch 1 according to the first embodiment of the invention. Other aspects of the third embodiment are the same as in the first embodiment, and further description thereof is omitted.

More specifically, in this embodiment, the gain of the LNA 121 of the RF unit 12 of the GPS receiver 10 (or the gain of the LNA 121 and IF amplifier 123) can be changed between multiple levels.

The locking level setting unit 15 sets the gain to a first gain level (high gain in the invention) when the locking performance is set to level 1, and sets the gain to a second gain (low gain in the invention) that is lower than the first gain when the locking performance is set to level 2.

Because satellite signals with low signal strength can be more easily locked by increasing the gain, the search time can be effectively shortened, but the peak current consumption increases. If the gain is low, the search time increases but the peak current consumption decreases.

This embodiment of the invention can reduce power consumption by the reception process as in the first embodiment. Furthermore, because the gain is set to the first gain setting in the manual reception process, the probability of being able to lock a satellite signal can be increased compared with when the gain is set to the second gain setting even if only satellite signals with low signal strength can be observed. As a result, the probability of successful reception can be increased particularly in the positioning mode that requires locking onto satellite signals from four satellites.

Note that when the locking performance can be set in three levels, level 1, level 2, and level 3, the gain may also be set to three gain settings, a first gain, second gain, and a third gain that is lower than the second gain.

Embodiment 4

The method of setting the satellite signal locking performance in the GPS wristwatch according to the fourth embodiment of the invention differs from the methods used by the GPS wristwatch 1 according to the first and third embodiments of the invention. Other aspects of the third embodiment are the same as in the first embodiment, and further description thereof is omitted.

More specifically, the number of correlators 44 that operate in the baseband unit 13 of the GPS receiver 10 can be configured in multiple levels in this embodiment of the invention.

When the locking level setting unit 15 sets the locking performance to level 1, it sets the number of correlators 44 to a first correlator count (high correlator count in the invention), and when it sets the locking performance to level 2, sets the number of correlators 44 to a second correlator count (low correlator count) that is lower than the first correlator count.

Because the correlation between the local code and satellite signals can be efficiently acquired by increasing the number of correlators 44, the search time can be shortened but the peak current consumption also increases. Decreasing the number of correlators 44 increases the search time but reduces the peak current consumption.

This embodiment of the invention can reduce power consumption by the reception process as in the first embodiment. Furthermore, because it is only necessary to change the number of operating correlators 44, the processing load on the baseband unit 13 can be reduced compared with changing the number of searches per unit time of the frequency of the satellite signal in the correlation process.

Note that when the locking performance can be set in three levels, level 1, level 2, and level 3, the number of operating correlators may also be set to a first correlator count, second correlator count, and a third correlator count that is lower than the second correlator count.

Other Embodiments

The invention is not limited to the embodiments described above, and can be varied in many ways without departing from the technical scope of the invention.

For example, when the reception mode is set to the automated timekeeping mode in the first embodiment, the satellite signal locking performance is set to level 2, but the invention is not so limited and the satellite signal locking performance may be set to level 3, for example.

Level 1, level 2, and level 3 in the foregoing embodiments are also not limited to the specific examples described above. More specifically, the level may be set appropriately according to the probability of successful reception in each reception mode, but level 2 is preferably approximately half of level 1, and level 3 is preferably approximately half of level 2.

The positioning mode in the foregoing embodiments is a manual positioning mode that forces the reception process in response to operating a button 6, for example, but the positioning modes may include a manual positioning mode and an automated positioning mode in which the reception process is executed when an automated reception condition is met. In this event, if the reception mode is set to the automated positioning mode, the locking level setting unit 15 sets the satellite signal locking performance in the same way as described in the automated timekeeping mode above.

The foregoing embodiments are described with reference to a GPS satellite 5 as an example of a positioning information satellite, but the positioning information satellite of the invention is not limited to GPS satellites and the invention can be used with Global Navigation Satellite Systems (GNSS) such as Galileo (EU), GLONASS (Russia), and Beidou (China). The invention can also be used with geostationary satellites in satellite-based augmentation systems (SBAS), and quasi-zenith satellites in radio navigation satellite systems (RNSS) that can only search in specific regions. The invention can also be used in configurations that receive and process satellite signals from multiple systems.

An electronic timepiece according to the invention is also not limited to a combination timepiece having both analog hands and a digital display, and the invention can obviously be used in analog timepieces having only hands, and digital timepieces having only a digital display. The invention is also not limited to wristwatches, and may be applied to pocket watches and other timepieces, cell phones, digital cameras, mobile terminals, and other electronic devices with a timekeeping function.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2014-104197, filed May 20, 2014 is expressly incorporated by reference herein.

What is claimed is:

1. An electronic timepiece comprising:
a reception unit that locks and receives satellite signals, and can set the locking performance for locking satellite signals on multiple levels;
an input unit;
a reception mode setting unit that sets the reception mode of the reception unit; and
a locking level setting unit that sets the locking performance;
wherein the reception mode setting unit sets the reception mode to an automated timekeeping mode that acquires time information based on the locked and received satellite signal when an automated reception condition is met,
sets the reception mode to a manual timekeeping mode that acquires time information based on the locked and received satellite signal when a first operation of the input unit is detected, and
sets the reception mode to a positioning mode that acquires positioning information and time information based on the locked and received satellite signals when a second operation of the input unit is detected; and
the locking level setting unit sets the locking performance to a high level when the reception mode is set to the manual timekeeping mode or the positioning mode, and
sets the locking performance to a low level that is lower than the high level when the reception mode is set to the automated timekeeping mode.

2. The electronic timepiece described in claim 1, wherein:
the reception unit has a correlation unit that determines the correlation between the satellite signal and a local code that is used to lock a satellite signal;
the correlation unit searches for a satellite signal frequency by sequentially changing the frequency of the local code in a set frequency band;
the number of searches per unit time of the frequency by the correlation unit can be set in multiple levels; and
the locking level setting unit sets the number of searches to a high search count when the locking performance is set to the high level, and
sets the number of searches to a low search count that is lower than the high search count when the locking performance is set to the low level.

3. The electronic timepiece described in claim 1, wherein:
the reception unit has an amplifier that amplifies the satellite signal;
the gain of the amplifier can be set to plural levels; and
the locking level setting unit sets the gain to a high gain when the locking performance is set to the high level, and
sets the gain to a low gain that is lower than the high gain when the locking performance is set to the low level.

4. The electronic timepiece described in claim 1, wherein:
the reception unit has a correlation unit that determines the correlation between the satellite signal and a local code that is used to lock a satellite signal;
the correlation unit has a plurality of correlators, and can set the number of correlators that operate in plural levels; and
the locking level setting unit sets the number of correlators that operate to a high correlator count when the locking performance is set to the high level, and
sets the number of correlators that operate to a low correlator count that is lower than the high correlator count when the locking performance is set to the low level.

5. The electronic timepiece described in claim 1, further comprising:
a solar cell; and
power output detection circuit that detects the output power of the solar cell;
the automated timekeeping mode including a light-based timekeeping mode that acquires time information based on the locked and received satellite signal when the power output detected by the power output detection circuit equals or exceeds an environment detection threshold, and
a scheduled timekeeping mode that acquires time information based on the locked and received satellite signal when a preset time is reached; and
the locking level setting unit sets the locking performance to a first level when the reception mode is set to the manual timekeeping mode or the positioning mode,
sets the locking performance to second level that is lower than the first level when the reception mode is set to the light-based timekeeping mode, and
sets the locking performance to third level that is lower than the second level when the reception mode is set to the scheduled timekeeping mode.

6. A satellite signal receiving method of an electronic timepiece having a reception unit that locks and receives satellite signals, and an input unit, the satellite signal receiving method comprising:
setting the reception mode of the reception unit to an automated timekeeping mode that acquires time information based on the locked and received satellite signal when an automated reception condition is met;
setting the reception mode to a manual timekeeping mode that acquires time information based on the locked and received satellite signal when a first operation of the input unit is detected;
setting the reception mode to a positioning mode that acquires positioning information and time information based on the locked and received satellite signals when a second operation of the input unit is detected; and
setting the locking performance to a high level when the reception mode is set to the manual timekeeping mode or the positioning mode; and
setting the locking performance to a low level that is lower than the high level when the reception mode is set to the automated timekeeping mode.

* * * * *